United States Patent
Gibbs

[11] Patent Number: 5,361,676
[45] Date of Patent: Nov. 8, 1994

[54] EXPLOSIVELY-SEPARABLE FASTENER WITH UMBILICAL CORD CUTTER

[76] Inventor: Jerry L. Gibbs, 1201 E. Drachman, No. 113, Tucson, Ariz. 85719

[21] Appl. No.: 92,908

[22] Filed: Jul. 19, 1993

[51] Int. Cl.⁵ ............................................. B64D 1/00
[52] U.S. Cl. ...................................... 89/1.14; 102/378
[58] Field of Search ..................... 102/378; 89/1.14; 60/635

[56] References Cited

U.S. PATENT DOCUMENTS

| | | | |
|---|---|---|---|
| 3,080,815 | 3/1963 | Simshauser | 89/1.14 |
| 3,108,540 | 10/1963 | Fletcher | 102/378 |
| 3,119,298 | 1/1964 | Brown | 89/1.14 |
| 3,185,090 | 5/1965 | Weber | 102/378 |
| 3,393,605 | 7/1968 | Parnell | 89/1.14 |
| 3,420,470 | 1/1969 | Meyer | 102/378 |
| 3,975,981 | 8/1976 | Seifert | 102/378 |
| 3,991,649 | 11/1976 | Patrichi | 89/1.14 |
| 4,062,112 | 12/1977 | Lake | 89/1.14 |
| 4,205,697 | 6/1980 | Gebelius | 89/1.14 |
| 5,177,317 | 1/1993 | Walker et al. | 89/1.14 |

*Primary Examiner*—David H. Brown
*Attorney, Agent, or Firm*—Antonio R. Durando; Harry M. Weiss

[57] ABSTRACT

An explosively-separable fastener that consists of two units held together in spring-loaded fashion by a hollow retaining bolt and adapted for mounting between two joined stages of a rocket. The rocket stages are connected by means of electrical contacts between the units and an umbilical line passed through the retaining bolt. An explosively-actuated cutter operable to sever the retaining bolt and the umbilical line threaded therethrough is mounted on a chamber disposed transversely to the retaining bolt. Upon actuation of the cutter, the hollow bolt and the umbilical line are severed releasing the spring-loaded assembly, thus also interrupting all electrical contacts between the two rocket stages.

19 Claims, 2 Drawing Sheets

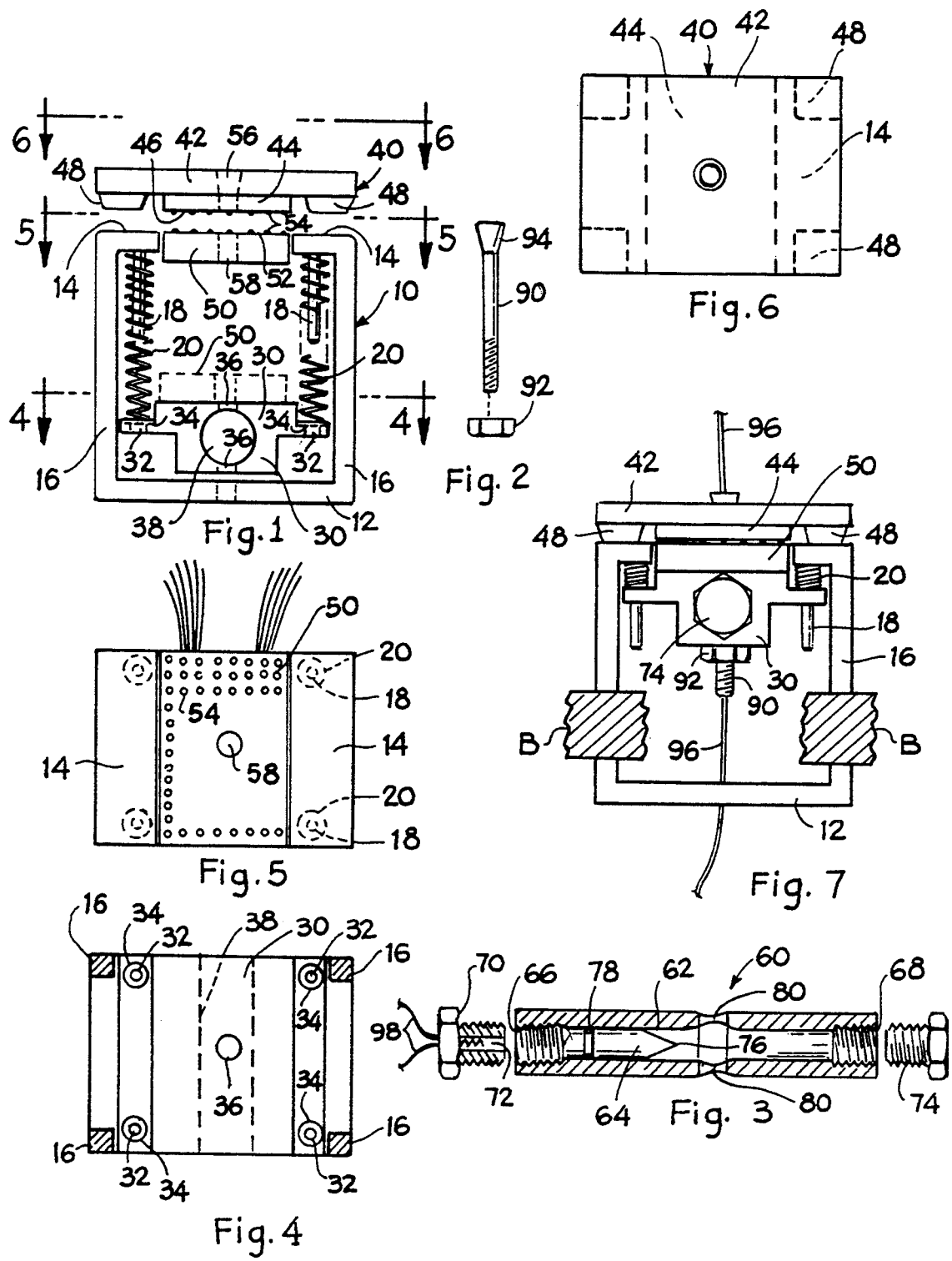

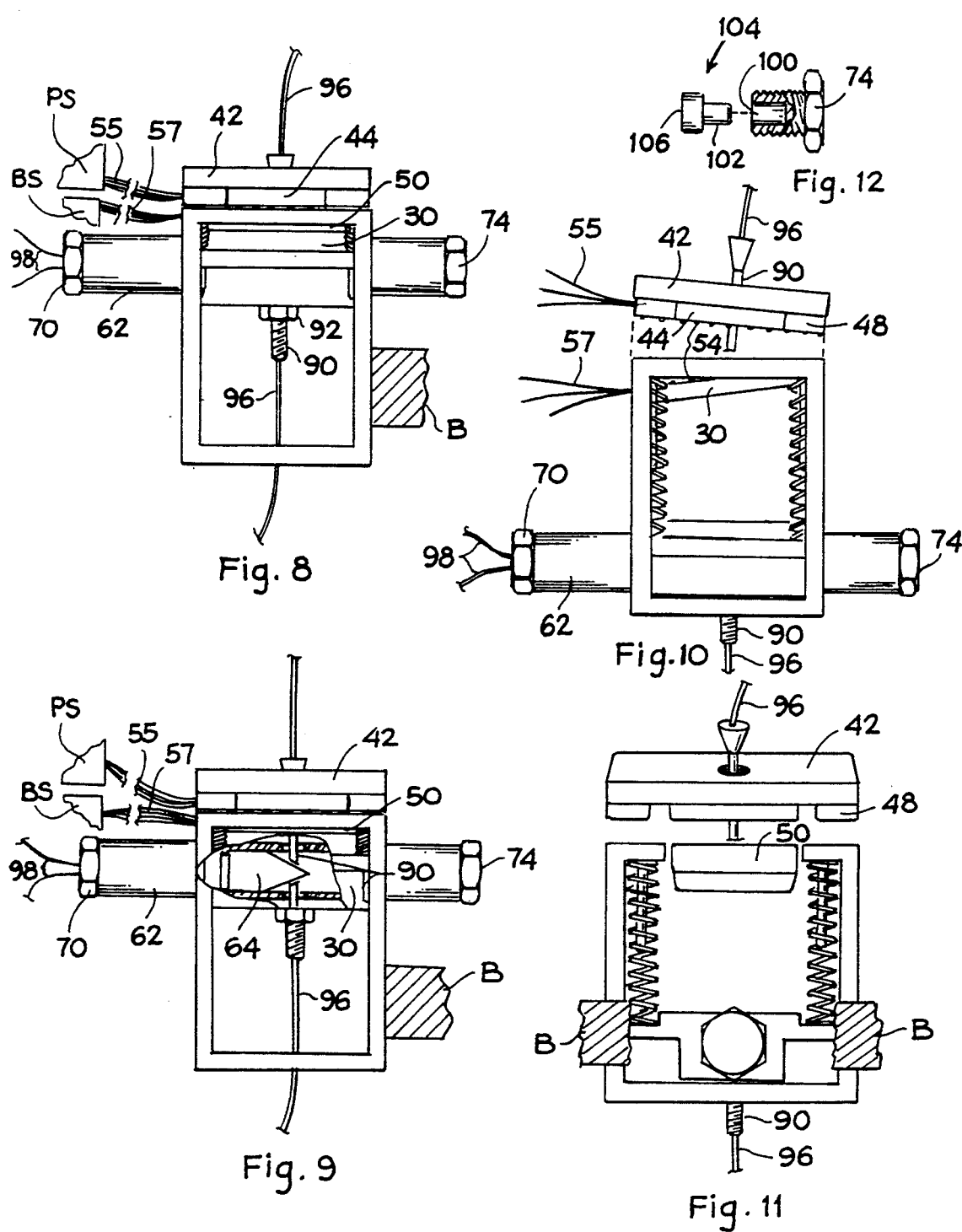

EXPLOSIVELY-SEPARABLE FASTENER WITH UMBILICAL CORD CUTTER

BACKGROUND OF THE INVENTION

1. Field of the Invention

This invention in general is related to mechanical fasteners for components that require remote and rapid separation by means of an explosive charge. In particular, the invention describes a reusable fastener for the explosively-actuated separation of multistage missiles in aerospace applications.

2. Description of the Related Art

Multiple-stage rockets require mechanisms for rigidly holding the stages together until separation becomes necessary during flight. Before separation, the stages must be in electrical connection for control purposes; in addition, an umbilical line between stages is often used to provide access to needed utility systems. For example, a rocket comprising a payload stage attached to a booster stage will normally have an electrical interface between the two stages and an umbilical cryogenic line for temperature control of the stages. The electrical interface is typically achieved by means of electrical connector plates that are held together by a compressive fastener that releases the two plates at the moment of separation of the two stages. The fastener structure also contains a cryogenic line running between the two stages, which needs to be cut at the same time the electrical connector plates are separated.

When separation between the booster and payload stages is required, it must occur rapidly and with a minimum of interference between the two components. Therefore, before the payload stage can be physically separated from the booster stage, the electrical interface between the two must be broken and the cryogenic line severed, so that the vehicle and the payload can become totally independent upon release of the fastening device between the two stages. Typically, separation of the electrical connector plates and severance of the umbilical line must be accomplished within a 250 millisecond time window.

Several devices have been developed in the past for fastening components that require rapid separation under difficult operating conditions. For example, U.S. Pat. No. 3,080,815 to Simshauser (1963) discloses a separation device that utilizes an electrical squib to cause the explosive separation of two press-fitted parts attached to adjacent stages of a rocket. The device is designed to function with minimum perturbation to the separated objects, so that a booster stage may be jettisoned from its payload without interfering with the trajectory of the rocket.

U.S. Pat. No. 3,119,298 to Brown (1964) describes another explosively-separable fastener that comprises a piston/cylinder combination of components mounted in slideable connection and held together by a shear pin. An electrical squib in the head of the cylinder is provided for causing the pin to shear and allow the separation of the two components on explosion.

In U.S. Pat. No. 3,185,090 (1965), Weber discloses a dual-charge explosive separation system for multistage rockets. The device is intended to prevent failures resulting from malfunction of single-charge systems.

U.S. Pat. No. 3,393,605 to Parnell (1968) describes a high-pressure explosive actuator for deep-water applications, such as required for oceanography exploration equipment. The device comprises a piston/cylinder combination wherein the travel of the piston is dampened by a spring that limits the effect of the actuating explosive charge.

In U.S. Pat. No. 3,420,470 (1969), Meyer discloses a band-shaped fastener for a satellite separation system. This device is designed to permit the separation of several satellites connected together by a spring-loaded mechanism for launching. Upon release of the tension in the retaining band fastening pairs of satellites, the springs are released and cause the units to separate.

Finally, U.S. Pat. No. 4,062,112 to Lake (1977) discloses a wire cutting device actuated by an explosive charge. A cylindrical barrel contains a slideable piston and an electric squib at one end, and a transverse opening designed to accept a wire inserted therethrough at the other end. When the charge is exploded, the piston is forced through the wire caught in the opening and severs it. The device can then be reset and recharged for further use.

The present invention resulted from an effort to design a light-weight compact, reusable explosively-separable fastener that also comprises a cutter that can be utilized to sever an umbilical cord running between two stages of a rocket. The devices currently used in the industry and described in the prior art are large, cumbersome and heavier than desirable for optimal spacecraft application. Therefore, there is still a need for an improved explosively-actuated fastener that is operable within the stringent specifications of current spacecraft technology.

SUMMARY OF THE INVENTION

One objective of this invention is a mechanical fastener for joining electrical connector plates of rocket stages and incorporating means for providing umbilical connection between the stages.

Another goal of the invention is a fastener that is explosively-separable in no more than 250 milliseconds and with minimum perturbation to the trajectory of the payload stage.

Yet another goal of the invention is a fastener that is capable of severing the electrical and umbilical connection between stages contemporaneously.

Another objective is a device that is compact and light-weight in order to reduce the mass and increase the fuel efficiency of the spacecraft.

Still another objective is a device that is reusable with minimum replacement of parts.

Another goal is a fastener capable of functioning at altitudes varying from sea level to 250 kilometers, under a wide range of corresponding temperature and pressure conditions.

A final objective is the economical manufacture of the fastener according to the above-stated criteria. This is achieved by using commercially available components and materials, modified only to the extent necessary to fit the requirements of the invention.

Therefore, according to these and other objectives, the present invention consists of a support frame adapted to be mounted on the bottom stage of two joined stages of a rocket and providing a retaining guide for a lower compression plate slideably mounted for vertical travel therein. The lower compression plate is urged downward by a set of springs against which the plate may be compressed upwardly along vertical guide pins attached to the support frame. The lower compression plate comprises a vertical perforation for passing an umbilical line therethrough and a horizontal cylindrical chamber disposed transversely to the vertical perforation for housing an explosively-actuated cutter operable to sever the umbilical line. An upper compression plate is adapted to rest against the top of the support frame and contains an orifice vertically aligned with the vertical perforation in the lower compression plate. The upper compression plate incorporates an upper electrical connector plate containing wiring to the upper stage and adapted to provide electrical contact with a lower electrical connector plate that is attached to the electrical system of the lower stage, all of these members also containing an orifice vertically aligned with the vertical perforation in the lower compression plate. Finally, the device comprises a hollow bolt adapted to house the umbilical line therethrough and clamp the upper and lower connector plates in electrical contact sandwiched between the upper and lower compression plates, this function being achieved by inserting the hollow bolt through the aligned vertical perforations in each member and securing the assembly in compression by means of a retaining nut. Upon actuation of the cutter, the hollow bolt and the umbilical line are severed releasing the spring-loaded lower compression plate for downward travel away from the upper compression plate, thus also releasing the lower electrical connection plate and interrupting all electrical contacts between the two stages.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 1 is an elevational front view of the support frame, upper and lower compression plates, and upper and lower electrical connector plates of the explosively-separable fastener of the present invention.

FIG. 2 is an elevational view of the hollow bolt and retaining nut combination used to compress the fastener of FIG. 1 into an electrically connected assembly.

FIG. 3 is an elevational side view of the explosively-actuated cutter used to sever the hollow bolt of FIG. 2 to separate the electrical connector plates of the invention.

FIG. 4 is a partially-sectioned top plan view taken from line 4—4 in FIG. 1.

FIG. 5 is a top plan view taken from line 5—5 in FIG. 1.

FIG. 6 is a top plan view taken from line 6—6 in FIG. 1.

FIG. 7 is an elevational view of the apparatus of the invention after assembly to form an electrical and umbilical connection between a payload and a booster rocket stages.

FIG. 8 is a view of the apparatus of FIG. 7 taken from the left-hand side thereof.

FIG. 9 is a partially cut-out view of FIG. 8 illustrating the projectile in the bolt cutter severing a retaining bolt and an umbilical line threaded therethrough.

FIG. 10 is a view of the apparatus of FIG. 8 after the projectile in the bolt cutter has severed the retaining bolt and the umbilical line allowing the compression plates to separate and interrupt the electrical and umbilical connection between stages.

FIG. 11 is a view of the disassembled apparatus of FIG. 10 as seen from the right-hand side thereof.

FIG. 12 is a partially cut-out view of an improved anvil of the bolt cutter of the invention.

DESCRIPTION OF THE PREFERRED EMBODIMENT

The most important inventive features of the apparatus described in this disclosure relate to the combination of an explosively-actuated cutter with a spring-loaded compression mechanism for fastening electrical connector plates and for concurrently housing an umbilical line between two adjacent stages of a rocket. The unit is designed to cause the separation of the electrical connector plates and the severing of the umbilical line at the same time as a result of a single explosive event.

Referring to the drawings, wherein like parts are designated throughout with like numerals and symbols, FIG. 1–3 illustrate in elevational view the components of an explosively-separable fastener according to the present invention. The fastener comprises a lower support frame 10, seen in front view in FIG. 1, that consists of a bottom plate 12 integral with or connected to two horizontal top rails 14 by means of vertical posts 16, which together define a vertical travel space for a conforming lower compression plate 30 enclosed therein. As made clear by the top plan views of FIGS. 4 and 5, the bottom plate 12 is preferably rectangular and the posts 16 are preferably disposed along each vertical corner of the frame 10 for ease of construction, but any shape that defines a vertical travel space for a correspondingly conforming lower compression plate would be acceptable to practice the invention. As shown in FIG. 5, the horizontal top rails 14 are preferably disposed in parallel along the depth of the frame 10, so as to be adapted to provide a retaining structure for the lower compression plate 30 below and a support structure for an upper support frame 40 disposed above. The rails 14 are also adapted to receive within strict tolerances a lower electrical connector plate 50 (which may be attached to or integral with the lower compression plate 30, as shown in phantom line in FIG. 1) when placed horizontally therebetween.

Vertical guide pins 18 are attached to the underside of the horizontal top rails 14 in alignment with corresponding vertical guide holes 32 in the lower compression plate 30 (shown in FIG. 4). The purpose of this pin/hole combination is to provide a guide for the vertical movement of the compression plate 30 within the frame 10. Accordingly, a sufficient number of guide pins and holes, or equivalent vertical guide means, is required for the proper functioning of the apparatus. Given the rectangular shape of the preferred embodiment's plan section, four guide pins and holes approximately near the corners of the section have been found to provide a stable arrangement. In addition, a vertical helicoidal spring 20 is mounted around each guide pin 18 in compression between the underside of the rails 14 and a receiving inset 34 in the top surface of the lower compression plate 30. Thus, the springs 20 urge the plate 30 downward and the upward movement of the plate requires that an upward force be applied to it.

The lower compression plate 30 contains a vertical perforation 36, preferably centrally from a plan-view prospective, and a transverse horizontal cylindrical chamber 38 passing through the vertical perforation 36 and adapted to receive an explosive bolt cutter 60 (shown in sectioned side view in FIG. 3). As known in the art (see U.S. Pat. No. 4,062,112, referenced above), the bolt cutter 60 comprises a straight cylindrical barrel 62 and a projectile 64 slideably engaged therein for longitudinal stroke motion between a threaded squib end 66 and a threaded anvil end 68. A threaded squib 70 having a cavity 72 adapted to contain an electrically-activated explosive charge and a threaded anvil 74 are mated to the threaded squib end 66 and anvil end 68, respectively, to form an enclosed barrel capable of withstanding the force generated by the charge upon explosion. The projectile 64 consists substantially of a cylindrical piston having a frontal sharp edge 76 capable of cutting through metallic material positioned in front of the projectile when the explosive charge is setoff. The projectile 64 may contain an annular channel for housing an O-ring 78 to improve compression during the explosion. A radial hole 80 it, the barrel 62 is provided for passing a bolt-like structure therethrough, such that the projectile 64 may cut it as it travels through the barrel 62 following activation of the squib 70. The anvil 74 is designed to absorb the energy of the moving projectile and stop it within the barrel. Thus, the bolt cutter 60 may be mounted into the chamber 38 with the radial hole 80 aligned with the vertical perforation 36, so that a bolt threaded therethrough may be cut when the bolt cutter is set off.

The upper support frame 40 consists of a horizontal upper compression plate 42 having the same size as the bottom plate 12 of the support frame 10 and of an upper electrical connector plate 44 attached to the bottom of the upper compression plate and having a bottom surface 46 substantially conforming to the top surface 52 of the lower electrical connector plate 50. Spacers 48, attached to the bottom surface of the upper compression plate 42 in correspondence with the rails 14, are provided to make it possible to align the bottom surface 46 of the upper electrical connector plate approximately with the height of the rails 14 when the upper support frame rests thereon. The upper and lower electrical connector plates 44 and 50 comprise matching fuzz buttons 54 (a zero-clearance type of connector) for electrical connection between the two plates, the fuzz buttons being in turn connected to the wiring 55 (seen in FIG. 8) and 57 of the payload and booster stage electrical systems, respectively. Moreover, as illustrated in FIG. 1 and 6, perforation 56 and 58 are provided in the two electrical connector plates such that they are vertically aligned with the perforation 36 in the lower compression plate 30 when the fuzz buttons of the electrical plates are in electrical contact.

Finally, the device of the invention comprises a hollow retaining bolt 90 and a matingly threaded retaining nut 92 (shown in FIG. 2) for clamping the compression plates 30 and 42 against the force exerted by the springs 20. The head 94 of the bolt 92 is illustrated as having a conical configuration corresponding to a conforming flared upper section of the perforation 56, which provides a press fit between the two, but any shape that would prevent the bolt from passing through the perforation would obviously be functionally equivalent and acceptable. The bolt 90 must be of a diameter suitable for insertion through perforations 56, 58, 36 and 80 and for housing an umbilical line threaded through the hollow center of the bolt. It must also be sufficiently long to pass through all of the mentioned perforations and be fastened in place by the retaining nut 92 when the lower compression plate 30 is moved all the way upward along the guide pins 18 to sandwich the lower electrical connector plate 50 (which may equivalently be attached to or integral with the compression plate 30) against the upper electrical connector plate 44, as illustrated in FIG. 7. Once so assembled, the device of the invention provides an explosively-separable electrical contact and umbilical connection between stages of a rocket. Typically, the support frame 10 is rigidly attached to a bracket member B of the booster stage BS (shown schematically in cross-section in the figures). As is best seen in FIGS. 7 and 8, the assembled fastener of the invention comprises the lower electrical connector plate 50 aligned with the upper electrical connector plate 44 so that corresponding fuzz buttons on the two plates are in contact; the electrical plates are clamped together between the upper and lower compression plates 42 and 30, which in turn are retained in that position by the bolt and nut assembly 90 and 92. An umbilical line 96 is passed through the hollow retaining bolt 90 and through a corresponding hole (not shown in the drawings) in the bottom plate 12 of the lower support frame; the line 96 provides a utility Connection between the lower booster stage and the upper payload stage PS. Normally the umbilical line 96 is used for cryogenic purposes, but it could equivalently be used to provide any type of utility services, such as pneumatic or hydraulic, that may be required for the proper functioning of the rocket. Thus, the electrical system of the booster stage is connected to the electrical system of the payload stage by means of the booster-stage wiring 57, the fuzz-buttons in the connector plates 50 and 44, and the payload-stage wiring 55.

The wires 98 of the squib 70 of the bolt cutter 60 are connected to the rocket's electrical system so that the cutter may be actuated at a time just prior to separation of the booster stage from the payload stage. As illustrated in FIG. 9, upon actuation of the squib the explosion within the barrel 62 causes the sharp edge 76 of the projectile 64 to cut through the retaining bolt 90 and the umbilical line 96 before it is stopped on impact on the anvil 74, whereby the spring-loaded lower compression plate 30 is released and forced downward by the action of the springs 20. When that happens, the upper support frame 40 is freed from the lower support frame 10 and it separates therefrom. The umbilical line 96 and the top portion of the bolt 90 remain engaged in the perforation 56 of the upper compression plate 42 and tend to pull it away from the lower support frame 10, as illustrated in FIGS. 10 and 11. So released, the lower electrical connector plate 30, sandwiched in electrical contact with the upper connector plate 54 by the compression plates prior to the explosion, becomes disengaged from the fastener assembly and linked to the booster stage in free-floating fashion only by means of the wiring 57. Upon separation of the two rocket stages, no electrical or umbilical connection remains that could cause any malfunction between the stages.

FIG. 12 illustrates an improvement to the anvil 74 of the bolt cutter shown in FIG. 3. Because of the extremely high velocity of the projectile 64 on impact, it normally becomes imbedded in the anvil and renders it inoperable for further use. This is especially true when aluminum is used as the material of choice because of its light weight, which is particularly important for aerospace applications. In order to protect the anvil 74 during impact, so that it may be subsequently reused, an additional component is utilized to absorb the energy of the projectile during impact. The anvil is provided with a hollow center 100 sized to receive the stem 102 of a shield plug 104 having a cylindrical head 106 adapted to provide a barrier between the projectile and the anvil. The head 106 is preferably sized with a diameter slightly smaller than the inside diameter of the barrel 62, so that it may be pushed therethrough, and with a thickness of at least ¼ inches (in aluminum), which has been found to be sufficient to absorb the impact of a steel projectile 64.

The design of the apparatus of the present invention was optimized to reduce its weight, minimize separation time, and increase the reliability of the device. Accordingly, it was designed for manufacture in aluminum (except for the springs, projectile and squib, which are made of steel) in as compact a configuration as possible. In the preferred embodiment of the invention, the lower support frame 10 is approximately 5.0 cm high with a 5.0 cm by 4.7 cm base; the upper support frame 40 has a conforming base size and is about 0.8 cm high, and it incorporates the electrical connector 44 within its thickness; the lower electrical connector plate 50 is incorporated within the lower compression plate 30; and the bolt cutter is approximately 7.0 cm long with a diameter of about 1.3 cm. The barrel 62 of the bolt cutter may be integral with the structure of the lower compression plate as well. It was found that because of its functional features, light weight and compactness, this device is able to effect separation of the electrical connections and severance of the umbilical line between stages in approximately 70 milliseconds, greatly exceeding the original objectives. In addition, the device was able to meet all specifications for electrical connection prior to separation, and for tolerance to shock, vibration and mechanical loading on the apparatus. As disclosed, the specific shape of the device is designed with the intent of containing all of the loose parts after separation, so as to minimize the cost of reuse.

Other than specifically described, the invention can obviously take other shapes with equivalent functionality and utility. For example, the device could easily be modified to have a frame defining a cylindrical rather than a rectangular travel space, or to have a bolt cutter with a rectangular rather than cylindrical cross-section. Similarly, the helicoidal springs could be substituted with any equivalent spring means adapted to urge the lower compression plate in a downward direction. In fact, any shape that is not specifically described as critical for any of the components is acceptable to practice the invention so long as it retains the functional characteristics described above.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. An explosively-separable fastener for providing a severable electrical connection and for housing a severable umbilical line between rocket stages, comprising:
   (a) lower compression means slideably mounted within a lower support frame;
   (b) spring means for urging said lower compression means downward within said lower support frame;
   (c) upper compression means disposed above said lower support frame in vertical alignment with said lower compression means;
   (d) separable electrical-connector means for providing electrical connection between said rocket stages, said electrical connector means being adapted to provide electrical connection upon mechanical contact of separable parts electrically connected to said rocket stages and being adapted to interrupt said electrical connection upon separation of said parts;
   (e) clamping means for securely sandwiching said separable electrical-connector means between said upper and lower compression means such that said separable parts are in mechanical contact, said lower compression means having been slideably lifted against said spring means in the lower support frame and retained in spring-loaded fashion by said clamping means, and said clamping means containing a hollow passage for housing an umbilical line running between said rocket stages; and
   (f) explosively-actuated cutting means adapted to be operable on said the clamping means and responsive to an actuating signal for severing said clamping means and said umbilical line, thereby releasing said spring-loaded lower compression means and separating said parts in mechanical contact in said electrical connector means, thus interrupting the electrical connection between said rocket stages.

2. The apparatus of claim 1, wherein said separable electrical connector means consists of an upper fuzz-button connector plate electrically connected to one of said rocket stages and of a lower fuzz-button connector plate electrically connected to another of said rocket stages.

3. The apparatus of claim 2, wherein said upper fuzz-button connector plate is attached to said upper compression means.

4. The apparatus of claim 2, wherein said upper fuzz-button connector plate is attached to said upper compression means and said lower fuzz-button connector plate is attached to said lower compression means.

5. The apparatus of claim 1, wherein said lower compression means comprises vertical guide holes; wherein said lower support frame comprises vertical guide pins aligned with said guide holes and adapted to slide therethrough; and wherein said spring means consists of a spring mounted around each said guide pins.

6. The apparatus of claim 5, wherein said lower compression means, said separable electrical-connector means and said upper compression means each comprises a substantially vertical perforation, all of such perforations being disposed in alignment to define a vertical opening through said three means; and wherein said clamping means consists of a hollow-bolt and nut assembly adapted to be inserted through said perforations to form a retaining clamp operating on sale three means and adapted to house said umbilical line therethrough.

7. The apparatus of claim 6, wherein said lower compression means includes a substantially horizontal chamber adapted to receive said explosively-actuated cutting means and wherein the substantially vertical perforation through said lower compression means intersects said substantially horizontal chamber.

8. The apparatus of claim 7, wherein said separable electrical connector means consists of an upper fuzz-button connector plate electrically connected to one of said rocket stages and of a lower fuzz-button connector plate electrically connected to another of said rocket stages.

9. The apparatus of claim 8, wherein said upper fuzz-button connector plate is attached to said upper compression means.

10. The apparatus of claim 8, wherein said upper fuzz-button connector plate is attached to said upper compression means and said lower fuzz-button connector plate is attached to said lower compression means.

11. The apparatus of claim 7, wherein said explosively-actuated cutting means consists of a bolt cutter comprising a barrel installed in said substantially horizontal chamber, said barrel having two ends and a radial hole disposed therebetween and adapted to receive said hollow bolt therethrough, said radial hole being further disposed in alignment with said substantially vertical perforation in the lower compression means; said bolt cutter further comprising at one end a squib responsive to a signal for setting off an explosive charge contained therein, comprising an anvil at the other end, and a projectile slideably engaged within said barrel for longitudinal stroke motion between said squib and anvil.

12. The apparatus of claim 11, wherein said projectile comprises a sharp edge capable of cutting through metallic material positioned in front of the projectile when the explosive charge is set off.

13. The apparatus of claim 12, wherein said separable electrical connector means consists of an upper fuzz-button connector plate electrically connected to one of said rocket stages and of a lower fuzz-button connector plate electrically connected to another of said rocket stages.

14. The apparatus of claim 13, wherein said upper fuzz-button connector plate is attached to said upper compression means.

15. The apparatus of claim 11, wherein said squib and anvil are threadedly mounted on said barrel.

16. The apparatus of claim 15, further comprising a shield plug removably connected to said anvil inside said barrel and adapted to provide a barrier between the projectile and the anvil.

17. The apparatus of claim 15, wherein said separable electrical connector means consists of an upper fuzz-button connector plate electrically connected to one of said rocket stages and of a lower fuzz-button connector plate electrically connected to another of said rocket stages.

18. The apparatus of claim 17, wherein said upper fuzz-button connector plate is attached to said upper compression means.

19. The apparatus of claim 15, wherein said upper fuzz-button connector plate is attached to said upper compression means and said lower fuzz-button connector plate is attached to said lower compression means.

* * * * *